April 10, 1962  M. E. WOOD  3,029,040
SPINNING REEL
Original Filed Aug. 22, 1955  4 Sheets-Sheet 1
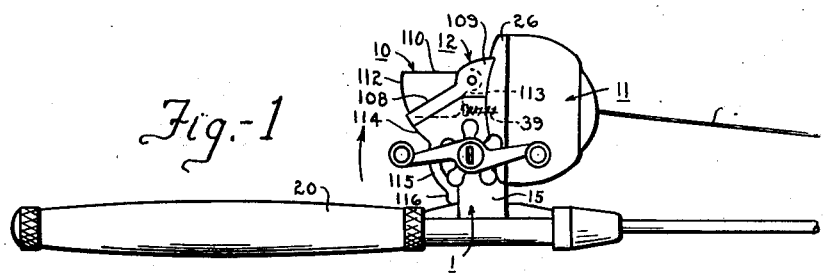
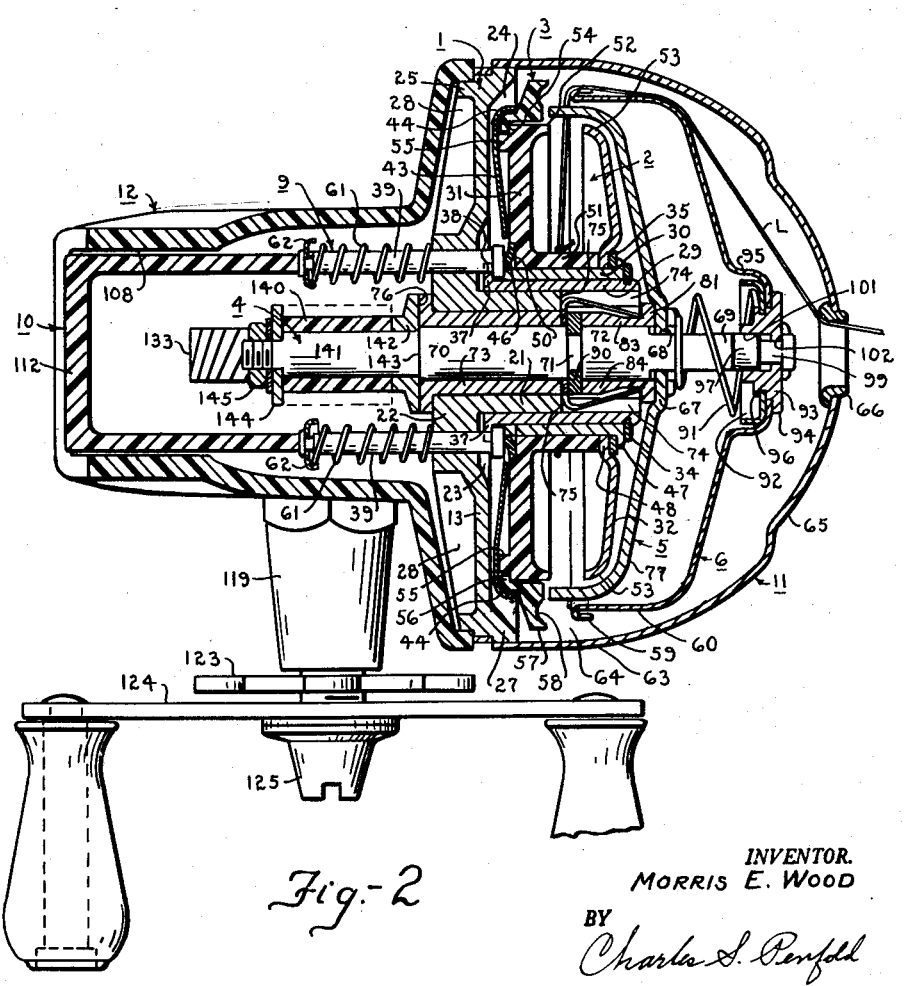
INVENTOR.
MORRIS E. WOOD
BY
Charles S. Penfold
ATTORNEY April 10, 1962 M. E. WOOD 3,029,040
SPINNING REEL Original Filed Aug. 22, 1955 4 Sheets-Sheet 2

INVENTOR.
MORRIS E. WOOD
BY
Charles S. Penfold
ATTORNEY

April 10, 1962     M. E. WOOD     3,029,040
SPINNING REEL

Original Filed Aug. 22, 1955     4 Sheets-Sheet 3

INVENTOR.
MORRIS E. WOOD
BY Charles S. Penfold
ATTORNEY

April 10, 1962 M. E. WOOD 3,029,040
SPINNING REEL

Original Filed Aug. 22, 1955 4 Sheets-Sheet 4

INVENTOR.
MORRIS E. WOOD
BY
Charles S. Penfold
ATTORNEY

United States Patent Office 3,029,040
Patented Apr. 10, 1962

3,029,040
SPINNING REEL
Morris E. Wood, Bronson, Mich., assignor to Higbie Manufacturing Company, Rochester, Mich., a corporation of Michigan
Original application Aug. 22, 1955, Ser. No. 529,855. Divided and this application Jan. 14, 1957, Ser. No. 634,039
9 Claims. (Cl. 242—84.2)

The invention relates generally to fishing reels and more particularly is directed to reels known as the spinning type.

One of the principal objects of the invention is to provide a reel of the spinning type in which the line is guided axially onto and off a spool in a manner whereby to prevent the line from twisting. In other words, provision is made for complete control of the line within the confines of the reel to avoid snarling or entanglements with any of the internal fixed or movable components of the reel structure.

More particularly, the reel embodying the invention includes, among other things, a spool, a line pickup, operating means for imparting relative rotational movement between the spool and pickup to direct a line onto the spool, a pair of axially disposed clamping elements, and actuating means for imparting relative axial movement between the clamping elements through movement of the spool for braking the movement of the line between the elements. One of the clamping elements is preferably made in the form of a brake drum located forwardly of the spool and the other clamping element preferably constitutes a component of the spool unit or assembly and is preferably made in the form of an annular guard or ring to assist in controlling movement of the line within the reel when the clamping elements are manipulated.

A specific object of the invention is to mount the clamping elements in a manner whereby they may be revolted in unison when in clamping relationship to brake movement of the line when the line is being pulled from the reel. These clamping elements are operatively related and actuated so as to provide a "feathering" or graduated line controlling means, thereby eliminating the sudden or too abrupt braking action usually present in reels of the spinning type.

An important object of the invention is to provide means for imparting relative axial movement between the spool unit and the pickup to render the pickup and the clamping elements inoperative in order to permit the line to freely unwind from the spool as desired when a cast is made. The arrangement is preferably such that the line in a casting operation will run radially outward from the spool and over the front clamping element or drum as distinguished from passing over any frontal flange or portion of the spool. In fact, the spool and pickup are so designed and constructed that the line will not ride axially over any portions thereof.

A significant object of the invention is to provide the reel with a frame which supports a front cap for covering the spool assembly, pickup and clamping elements and a rear protecting enclosure for supporting parts of the movement imparting means, above referred to, so that the majority of the components of the reel are arranged in a housing.

Another important object of the invention is to provide the cap with a line guide opening in front of the brake drum and form the brake drum and the cap in a way that movement of the line in passing from and onto the spool is controlled thereby with the rear guard ring serving to prevent the line from working to the rear of the spool. In other words, the guard, brake drum and cap are arranged in a predetermined relationship to control or influence movement of the line when a cast is made and without interference by the pickup. When the line is being retrieved and directed onto the spool the cap and brake drum will also serve to control movement of the line therebetween but the guard ring will not normally assist in this respect.

A further object of the invention is to provide means for holding the pickup in a nested or inoperative position within the confines of the brake drum when a cast is made and an arrangement for automatically returning the pickup to an operative position to direct a line onto the spool when the driving means of the reel is rotated in a line winding direction.

Also, an object of the invention is to provide an adjustable drag mechanism for the pickup when the line is being reeled in and onto the spool.

An additional object of the invention is to provide the actuating means or mechanism, above referred to, with components connected to the spool is distinguished from being connected to an annular brake for moving the brake forwardly of a spool to engage a line pickup to impart a braking action to a line as exemplified in at least one prior art patent on the subject.

A still further object of the invention is to provide a manual actuator which is operatively connected to the actuating means and mounted on the rear enclosure, above referred to, in such a way that it can be depressed by a digit of the hand, in a natural gripping direction toward a handle on which the reel is adapted to be mounted, for convenience and facilitating its actuation and for the purpose of promoting the efficiency of its thrust action against the actuating mechanism.

Another object of the invention is to provide a reel with a unique reversible ratchet mechanism which may be readily adjusted to convert the reel for use by either a left or right handed person, the arrangement being such that the reel is adapted to be mounted on the top side of a rod or pole for right hand use and on the bottom side of the pole for left hand use.

A particular object of the invention is to provide an improved operating or driving mechanism for the pickup including a frictionally driven gear and a novel clicking device associated therewith.

A specific object of the invention is to provide an improved setup to facilitate assembly of the brake drum with the shaft on which it is mounted.

Additional objects of the invention reside in providing a reel housing of pleasing design; a reel which is efficient and durable; and a reel comprised of components which are designed and constructed to facilitate their manufacture and assembly on a production basis.

Other objects and advantages of the invention will become apparent after the description hereinafter set forth is considered in conjunction with the drawings annexed hereto.

In the drawings wherein a preferred embodiment of the reel is exemplified:

FIGURE 1 is an elevational side view showing the reel applied to the top side of a pole for right hand use;

FIGURE 2 is an enlarged longitudinal section through the reel illustrating structural deatils and with the components disposed for winding or directing a line onto the spool;

Figure 15:
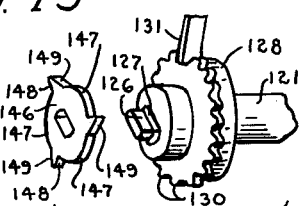
Figure 16:
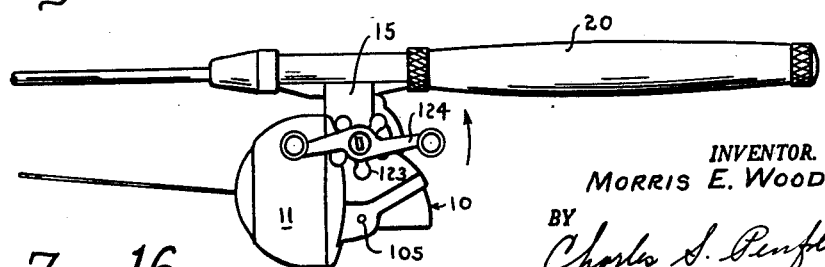

FIGURE 15 is an exploded view of parts of the ratchet mechanism showing the ratchet in a reversed position for assembly to permit use of the reel by a left handed person, in which event the pickup can only be rotated in a direction opposite to that permitted for right hand use; and FIGURE 16 is a side elevational view, similar to FIGURE 1, depicting the reel mounted on the bottom side of a pole or rod for left hand use.

This application is a division of my copending application, Serial No. 529,855, filed August 22, 1955.

Referring generally to the reel structure exemplified in FIGURES 1 through 13 of the drawing, numeral 1 designates a frame, 2 a spool assembly having a guard ring 3, 4 a rotatable driven shaft, 5 a line pickup mounted on the shaft for movement therewith and for axial movement thereon relative to the spool asesmbly, 6 a brake drum rotatably mounted on the fore end of the shaft, 7 operating or driving means for driving the shaft and pickup, 8 drag means associated with the operating means, 9 actuating means connected to the spool, 10 a manual actuator for moving the actuating means to impart relative axial movement between the spool assembly and drum, 11 a cap connected to the frame for covering the components in front of the frame, and an enclosure 12 for substantially covering those components at the rear of the frame.

Figure 3:
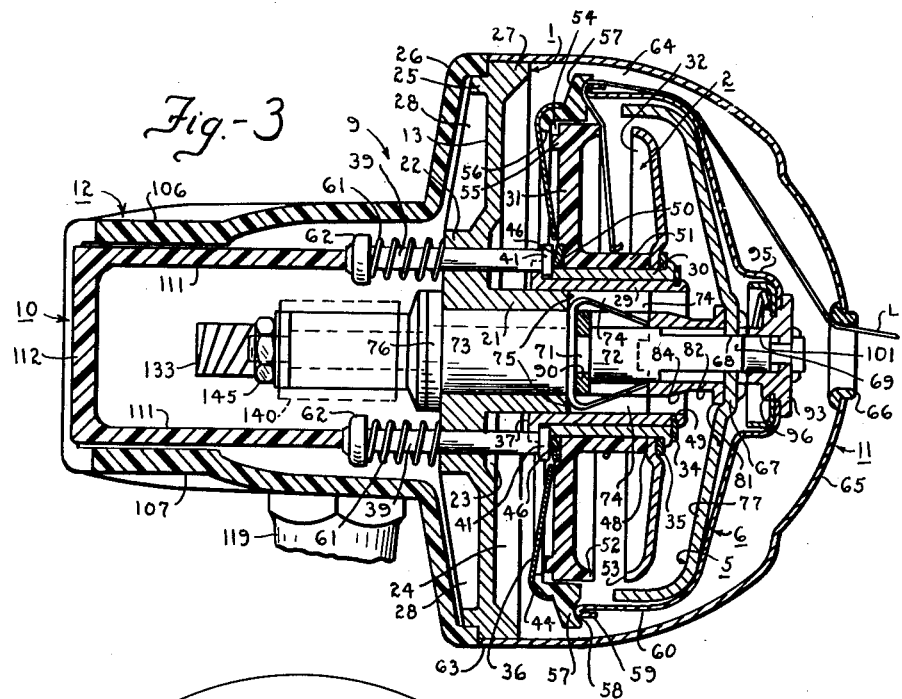
FIGURE 3 is a view, similar to FIGURE 2, showing the line pickup in a nested or inoperative position within the brake drum and with the line clamped between the drum and rear guard ring.
Figure 4:
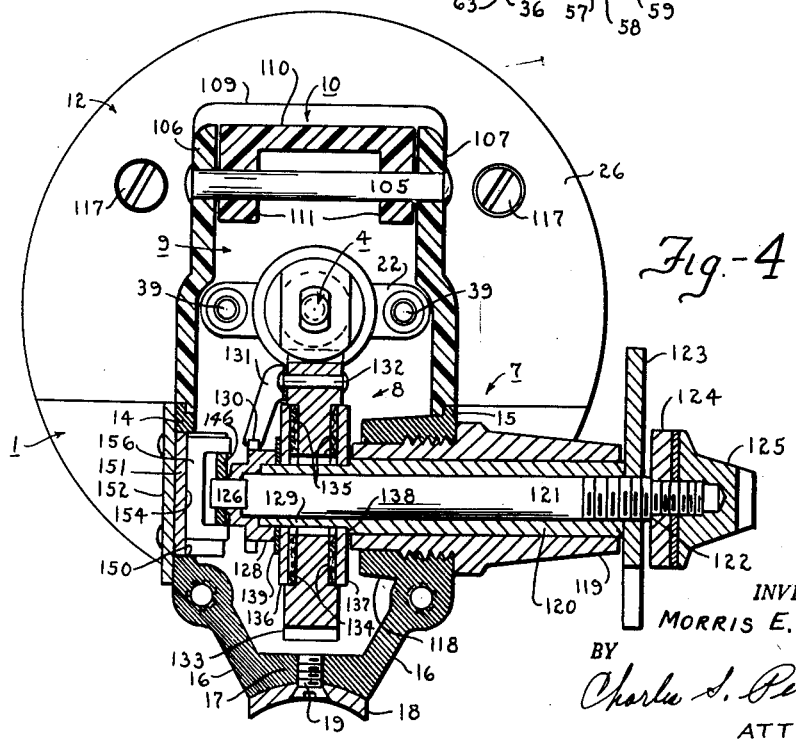
FIGURE 4 is a transverse section taken through the rear part of the reel and illustrates structural details of the driving means, actuating means and actuator therefor, drag means, and the reversible ratchet mechanism.
Figure 5:
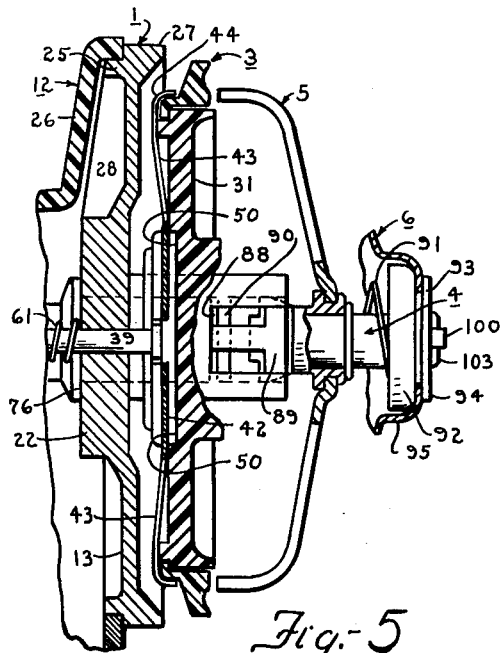
FIGURE 5 is a partial view, similar to FIGURES 2 and 3, showing the pickup in a transitory position of its movement.

The reel frame 1 is preferably cast or moulded from a suitable material and, among other things, includes a round wall 13, a pair of lower rearwardly extending parallel side walls 14 and 15 having converging portions 16 joined by a longitudinal bridge 17 having a concave seat in its underside within which a plate 18 is secured by a fastener 19 as illustrated in FIGURES 1, 3 and 4. The plate serves to attach the reel to either the top or bottom side of a pole 20 to locate the longitudinal axis of the reel in parallel relation to the longitudinal axis of the pole. The round wall 13 has a centrally disposed forwardly extending tubular support 21 and a rearwardly extending boss 22. The front side of the wall is provided with a relatively small clearance recess 23 and a larger counter clearance recess 24 for rear parts of the spool assembly.

The wall is further provided with an axially extending peripheral formation having a rear flange 25 on which a concave forward portion 26 of the rear enclosure 12 is seated and a forward flange 27 on which the cap 11 is mounted. It will be noted that the wall 13 is preferably reenforced by radial webs 28 joining the rear flange 25 and the boss 22. The manner in which the cap and enclosure are attached to the reel frame and their respective functions will be described more in detail subsequently.

Figure 8:
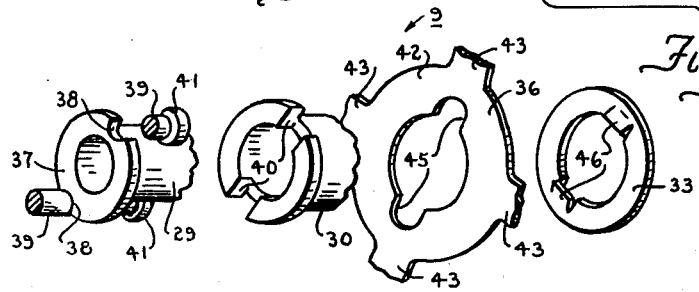
FIGURE 8 is an exploded view showing details of parts of the actuating means and mode of operatively connecting them with parts of the spool assembly.

The spool assembly 2, as exemplified in FIGURES 2, 3 and 8, includes a tubular fitting 29, a tubular bushing 30, a rear spool flange 31, a front spool flange 32, a washer 33, a locking part 34, a washer 35, a flexible member 36, and the guard ring or clamping element 3 above referred to. These components are all connected together to constitute a unit which is mounted for axial movement on the tubular support 21 in front of the wall 13 through the intermediation of the actuating means 9 and the manual actuator 10 therefor.

More particularly in this respect, the tubular fitting 29 is provided with a rear radial flange 37 having a pair of notches 38 therein for respectively receiving a pair of corresponding plunger rods 39 constituting components of the actuating means as illustrated in FIGURES 2, 3 and 8. The rods extend through holes in radial portions of the boss 22 for support to impart forward axial movement to the spool assembly. The bushing 30 is mounted on the fitting 29 and has a radial flange provided with a pair of notches 40 which register with the notches 38 in the flange 37 of the fitting 29 for receiving heads 41 formed on the fore ends of the rods. The flexible member 36 has a hub 42 preferably provided with four corresponding equally spaced apart resiliently flexible radial legs 43 having curved ends to provide individual seats 44 on which the guard ring 3 may rotate. The hub 42 is provided with an aperture which receives the bushing 30 and also has a pair of radial clearance openings 45, as shown in FIGURE 8. The washer 33 is mounted on the bushing 30 in front of the flexible member 36 and is provided with resilient projections 46 which extend rearwardly through the clearance openings 45 into the notches 40 of the bushing 30 so that the heads 41 of the rods will bear against the projections to prevent vibration or rattle between the spool assembly and the rods. The fore part of the bushing 30 is upset at 47 and the washer 35 is interposed between this upset and the base wall of a recess 48 in the front flange 32 of the spool to secure the spool flanges, washer 33 and flexible member 36 to the bushing 30. The fore part of the fitting 29 is provided with an annular exterior groove 49 which receives the locking part 34, the latter preferably being in the form of a split resilient ring for holding the aforesaid spool components detachably assembled as a unit with the fitting 29. The recess 23 in the front side of the wall 13 of the reel frame provides clearance for the radial flange 37 on the fitting 29 and the counter-recess 24 provides clearance for the guard ring 3, flexible member 36 and the rear flange of the spool when the spool assembly is in its normal retracted position, as shown in FIGURE 2, in which position the pickup 5 can be rotated to direct a line L onto the spool. Although this arrangement may be modified, it will be noted that the plunger rods 39 are connected to the spool proper and not to the guard ring 3 or flexible member 36 associated therewith.

The rear spool flange 31 is preferably made from plastic and is provided with a rear recess 50 for receiving the washer 33. The flange 31 also has an axially extending cylindrical hub 51 which bears against the rear surface of the recessed portion 48 of the front spool flange 32 so that inturned opposed axially extending peripheral portions 52 and 53 of the flanges 31 and 32 of the spool will be maintained in a predetermined spaced relationship to provide a throat through which the line L may radially pass. It will be noted that the front spool flange is generally conical or dished in shape; that the rear spool flange is formed to nest within a front recess 54 formed in the guard ring, and that the rear side of the rear flange is provided with an annular abutment 55 which is engaged by the radial legs 43 of the flexible member 36 so that the guard ring 3 is more or less loosely supported to float between the rear spool flange and flexible member. The ring includes a base wall 56 which is interposed between the flange 31 and the flexible member. The ring, as shown in FIGURE 2, also includes a radial peripheral flange 57 provided with an annular concave groove 58 at its front side for receiving a rear annular rounded marginal edge 59 of a cylindrical peripheral portion 60 of the brake drum 6 when the spool assembly is moved forwardly a predetermined distance by depressing the actuator 10 with a digit of the hand, such as the thumb.

The spool assembly is preferably normally held in a rear retracted position, as shown in FIGURE 2, by a pair of helical springs 61 surrounding the plunger rods 39. The rear end of each rod is preferably provided with a reduced portion which supports a cup-shaped abutment 62. The ends of the springs respectively bear against the abutments 62 and the boss 22 on the wall 13. The mode of actuating the plunger rods by the actuator 10 and the manner of mounting the actuator on the enclosure 12 will be described subsequently.

Attention is directed to the fact that portions of the guard ring and brake drum are preferably disposed in spaced concentric relationship about the spool as well as about the pickup for clamping the line preferably at a point located exteriorly of the spool and pickup. Of further importance is the fact that the radial portion 57 of the guard ring serves to prevent the line from working back and in between the ring and wall 13 of the reel frame. The axial relationship of the ring and the cylindrical portion 60 of the brake drum and their concentric relationship to a cylindrical and/or curved portion 63 of the cap 12 define an annular passage 64 for controlling or guiding the line, particularly when it leaves the spool during a cast. The cap is preferably bell-shaped and also includes a frontal portion 65 provided with an eye member 66, at its apex through which the line passes. This member is preferably constructed from a suitable hardened material to prevent line wear. The cap is preferably detachably connected to the forward flange 27 of the wall 13 by providing the flange with bayonet recesses and the portion 63 of the cap with bayonet projections which seat in the recesses.

Figure 6:
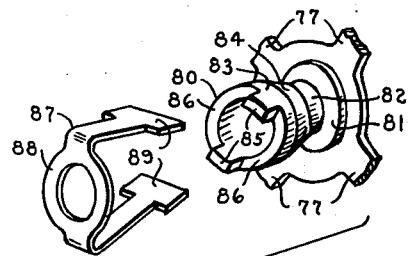
FIGURE 6 is an exploded view depicting details of structure employed to assist in maintaining the pickup in operative and inoperative positions.
Figure 10:
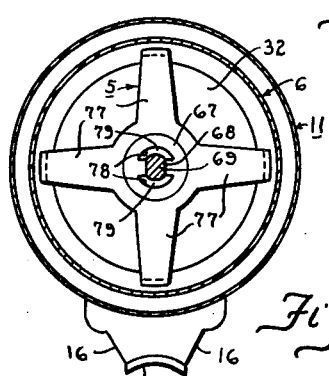
FIGURE 10 is a transverse section taken through an appropriate part of the reel to show the operative relationship between the brake drum and line pickup.
Figure 9:
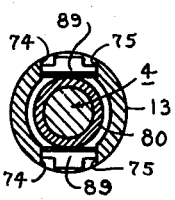
FIGURE 9 is a transverse section showing details of the mounting for the line pickup.
Figure 11:
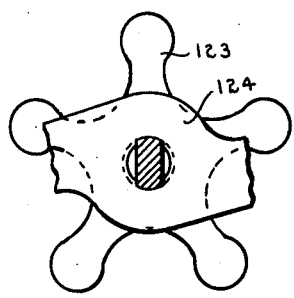
FIGURE 11 is a partial side view of the crank utilized to operate the driving means and the manual control for adjusting the drag means.
Figure 12:
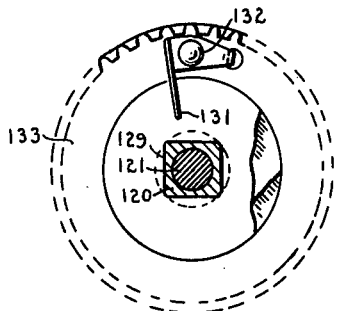
FIGURE 12 is a transverse section taken through an appropriate part of the reel to show details of a drive gear and a clicker detent carried thereby for engaging a toothed member to produce a clickwise sound.

The pickup generally designated 5 and its operative relationship with the spool assembly and brake drum 6 will now be described. This particular structure, as exemplified in FIGURES 2, 3, 5, 6 and 10, includes a hub having a recessed portion 67 provided with a squared opening 68 through which a squared portion 69 of the driven shaft 4 extends to key the pickup for rotation with the shaft and for axial movement thereon. The shaft also includes a cylindrical portion 70, a neck portion 71, and a cylindrical portion 72 which rotates in a tubular bearing 73 fixed in the tubular support 21 of the reel frame. The tubular support 21 is provided with a pair of diametrically disposed axially extending slots 74 having bases 75. The fore end of the tubular bearing 73 is disposed flush with the bases 75 and its rear end has a flange 76 bearing against the boss 22 on the wall 13. The hub of the pickup is provided with a plurality of corresponding radial legs or arms 77, preferably four in number. The legs preferably include straight portions, the outer extremities of which are curved rearwardly with their ends extending in general axial alignment with the guard ring but not normally in engagement therewith. The recessed portion 67 of the hub, as shown in FIGURE 10, is also provided with a pair of diametrically disposed arcuate openings 78 which receive forward projections 79 of similar shape formed on the fore end of a tubular part 80. When the pickup is moved forwardly by the spool assembly in a manner to be described subsequently, the tubular part will be caused to slide on the cylindrical portion 72 and squared portion 69 of the shaft. The part 80, as shown in FIGURES 2, 3 and 6, includes a flange 81 against which the hub of the pickup bears for stabilizing the pickup when the projections 79 are upset to secure the part and pickup together for movement as a unit. The part 80 also includes a reduced cylindrical portion 82, adjacent the flange 81, a larger cylindrical portion 83, and an intermediate tapered cylindrical portion 84. The larger portion 83 is provided with a pair of diametrically disposed rearwardly extending axial continuations 85 and a pair of arcuate abutment surfaces 86.

When the pickup is moved forwardly a predetermined distance by the actuator 10 through the agency of the spool assembly, a generally U-shaped spring 87 serves to temporarily hold the pickup in a forward position in the brake drum as exemplified in FIGURE 3. The spring, shown in FIGURES 2, 3 and 6, includes a base 88 and a pair of forwardly extending converging T-shaped fingers having enlarged ends 89. The base is provided with a hole which receives the cylindrical portion 70 of the shaft 4 and a split washer 90 is secured to the neck 71 of the shaft for securing the spring in place with its base 88 against the end of the fixed bearing 73 and/or the bases 75 on the tubular support 21, and the fingers disposed in the slots 74 of this support with their enlarged ends 89 normally bearing against the flange 81 and the reduced cylindrical portion 82 of the tubular part 80, as shown in FIGURE 2.

A tapered helical spring 91 encircles the squared portion 69 of the driven shaft and has a small end engaging the upset projections 79 of the tubular part 80 and a large end engaging a cup 92 carried by a fitting 93 which carries the brake drum 6. This helical spring assists in normally urging the pickup rearwardly and in locking the fitting 93 to the driven shaft. As will be explained more in detail subsequently, when the pickup is moved forwardly the enlarged ends 89 on the fingers of the spring 87 will ride successively on the tapered cylindrical portion 84 and portion 83 and when a predetermined forward position of the pickup is reached, the spring fingers will move toward one another to cause the enlarged ends thereof to engage the arcuate abutment surfaces 86 on the part 80 and thereby temporarily hold the pickup in the position shown in FIGURE 3 to permit unwinding of the line from the spool. The reel can also be operated to control release of a line whenever the fingers of the pickup are disposed within the confines of the drum in a position in which the enlarged ends 89 of the spring are not in engagement with the abutment surfaces 86. If the pickup and part 80 carried thereby happen to be in a rotative position in which the spring fingers are aligned with the axial continuations 85, the fingers will not snap against the surfaces 86 when the pickup is moved forwardly to the extent depicted in FIGURE 3, because the enlarged ends of the fingers will be bearing against the continuations. However, if the pickup is projected forwardly a sufficient distance in advance of the postion shown in FIGURE 3, the legs of the spring will snap toward one another and cause the enlarged ends of the spring to engage the end surfaces of the continuations 85. With this setup the pickup can be moved forwardly and temporarily held in either of two forward positions substantially within the confines of the drum to permit control and/or free release of the line from the spool when or after a cast is made. Irrespective of whether the enlarged ends of the spring are bearing against the ends of the continuations or against the surfaces 86, rotation of the pickup by the driving or operating mechanism will cause the spring fingers to spread apart a distance corresponding to the diameter of the cylindrical portion 83 of the tubular part 80, whereupon the helical spring 91 will automatically force the pickup back to its normal operating position for directing the line onto the spool as depicted in FIGURE 2. Movement of the pickup back to its operative position is assisted or advanced by the force of the spring fingers bearing on the tapered cylindrical portion 84 of the part 80 until the enlarged ends of the spring take the positions shown in FIGURE 2.

Figure 7:
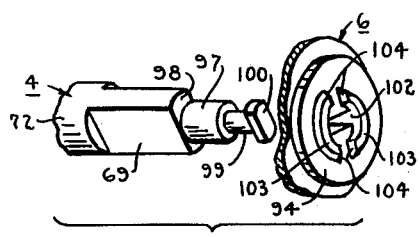
FIGURE 7 is an exploded view showing details of the structure used to facilitate operative connection of the brake drum and a driven shaft.

The mode of attaching the fitting 93 to the driven shaft is unique and will now be described. The fitting, as shown in FIGURES 2 and 7, includes a flange 94 and the drum 6 is provided with a central recessed portion 95 having a hole therein which receives a portion of the fitting so that the base of the portion 95 will engage the flange 94 when the cup 92 is secured to the fitting and related to this base by upsetting a portion of the fitting as indicated at 96 in FIGURE 2. The flange 94 and cup jointly serve to secure the drum in a stabilized position on the driven shaft 4 for free rotation relative to the fitting and shaft. As will be explained more in detail subsequently, when the brake drum and guard ring 33 are in a clamping relationship and a pull is exerted on the line, the drum and ring are free to rotate in unison with respect to the longitudinal axis of the driven shaft when the shaft is idle. This shaft, as evidenced in FIGURES 2 and 7, is provided with a cylindrical portion 97 adjacent its squared portion 69 to form a shoulder 98; a smaller cylindrical portion 99; and a generally rectangular head 100 aligned with the squared shaft portion 69. The fitting 93 is also provided with a round hole 101, a squared hole 102 and its front side with arcuate formations 103 spaced to provide pairs of abutments 104 or notches disposed generally in a line at right angles to or transverse to the length of the shaft head 100. The arrangement is such that the fitting, drum and cup as a unit can be readily detachably connected to the shaft by merely threading the head 100 through the holes 101 and 102 and beyond the arcuate formations 103 and then turning the unit so that the head 100 is aligned with the abutments, whereupon the unit is moved outwardly to locate the head or ends thereof between the abutments 104, so that the helical spring 91 will hold the head in place to prevent relative rotation between the fitting and the shaft. Obviously, other ways may be employed to connect the drum to the shaft, but the one exemplified has proven successful in use and has the advantage that no tools are required to effect the connection.

The actuator 10 and mode of operatively connecting it to the rear enclosure 12 and the plunger rods will now be described. The actuator, as shown in FIGURES 1, 3 and 4, is preferably made in the form of a hollow lever pivoted on a cross-pin 105 carried by side walls 106 and 107 of the enclosure. The lever is disposed in a generally rectangular opening 108 provided in an inclined or sloping top wall 109 of the enclosure. The lever includes a top wall 110, side walls 111 and an arcuate rear wall 112. The forward edges of the side walls constitute abutment or cam surfaces 113 which, as indicated by the dotted lines in FIGURE 1, bear against the inner ends of the rods 39. The top wall 110 of the lever is provided with a portion which is held against the underside of the top wall 109 of the enclosure through the action of the springs 61 to maintain the lever in a position for operation with its top wall 110 in a substantially horizontal position. The top wall of the lever is also dished or made concave to receive a digit of the hand and the location of the cross-pin 105 and the relationship of the actuator and plunger rods are predetermined so as to obtain a smooth and easy operating leverage action which can be accurately controlled by variable pressures applied to the lever in a natural gripping direction toward the pole.

The rear enclosure also includes a wall having an arcuate portion 114, an arcuate portion 115 and a depending portion 116. The arcuate portion 114 is on a radius slightly greater than the radius of the rear arcuate wall 112 of the lever for clearance and promoting continuity between the enclosure and lever. The side walls of the enclosure are widened at certain locations to provide clearance for the plunger rods and are notched to conform with and engage upper and rear edge portions of the side walls 14 and 15 of the reel frame 1 and the arcuate portion 115 and depending portion 116 of the enclosure are adapted to bear against rear edge portions of the walls 14 and 15. As shown in FIGURE 4, a pair of screws 117 extend through the upper part of the forward concave portion 26 of the enclosure 12 and connect with the wall 13 of the frame. Screws, not shown, also extend through the depending portion 116 into the side walls 14 and 15 of the frame and connect with holes, as shown in FIGURE 4, to detachably connect the enclosure to the frame. The enclosure and frame are snugly interfitted to promote manufacture and rapid assembly thereof, stability and exclude foreign matter.

The operating or driving mechanism 7 for rotating the pickup 5, as depicted in FIGURES 2, 4, 11, 12 and 13, will now be described. The side wall 15, as shown in FIGURE 4, is provided with a tubular portion 118 extending transversely between the side walls. This tubular portion has internal threads and a tubular member 119 extends into this portion and has threads which connect with the threads on the portion 118. A tubular drive shaft 120 is mounted in the tubular member 119 for rotational movement. A solid drive shaft 121 extends through the tubular shaft and its outer end is threaded and also squared to provide a shoulder 122. A star wheel 123 engages the outer end of the tubular shaft and is threadedly connected to the solid shaft for convenient manipulation adjacent a hand crank 124. The crank has a squared opening which receives the squared portion of the solid shaft to key the crank thereto. A nut 125 secures the crank to the shaft and against the shoulder 122 and a washer is interposed between the crank and nut. The solid shaft also has an axially extending inner squared end 126 which extends through a squared hole 127 in a driven member 128 and is upset to key the member thereto. The tubular shaft 120 is also provided with a squared portion 129. It will be noted that the driven member is provided with a squared recess which receives the squared portion 129 of the tubular shaft 120 to key the member thereto against rotation. The driven member 128 is provided with a flange having teeth 130 which are adapted to selectively cooperate with a flexible detent 131, preferably secured by a rivet 132 to a drive gear 133 rotatably mounted on the squared portion 129 of the tubular shaft. The detent is located to produce an audible clicking sound or signal whenever relative rotation occurs between the drive gear and the driven member. The opposite sides of the drive gear 133 are recessed as indicated at 134 and a pair of corresponding flat friction members 135, constructed of some desirable compressible material such as leather washers, are respectively seated in the recesses and a pair of corresponding relatively rigid friction members 136 and 137 preferably of metal, are keyed to the squared portion 129 of the tubular shaft by squared holes in the members cooperating with the squared portion, while the leather washers are free to rotate on such portion of the shaft as well as with respect to the members 136 and 137. The member 137 engages a shoulder 138 on the tubular shaft and the other member 136 engages a spring washer 139, the latter engaging the driven member 128. This unique arrangement is such that by manipulating the star wheel 123 the leather washers can be compressed against the drive gear to provide a variable frictional clutch mechanism between the drive gear and the tubular shaft 120.

The drive gear 133, as shown in FIGURE 2, is operatively connected to a pinion gear 140 which may be constructed of any suitable material. This pinion gear is mounted on a cylindrical rear extremity 141 of the driven shaft 4 between a thrust member 142 engaging a shoulder 143 on the shaft and a thrust member 144 carried by a squared and threaded end of the shaft. A nut 145 serves to clamp the pinion between the thrust members and against rotation with respect to the shaft. It will be noted that the thrust member 142 also bears against the flange 76 on the tubular fixed bearing 73 to limit forward movement of the shaft and that the base 88 of the U-shaped spring and split washer 90 serve to limit rear movement of the shaft.

As alluded to above, one important feature of the invention resides in converting the reel for use by either a right or left handed person. When the reel is mounted on the upper side of a pole 20, as shown in FIGURE 1, and the anti-reverse mechanism is disposed as in FIGURE 14, the reel is adapted for right hand use and when the ratchet of the mechanism is reversed the reel is adapted for left hand use when mounted on the underside of the pole as depicted in FIGURE 16.

Figure 13:
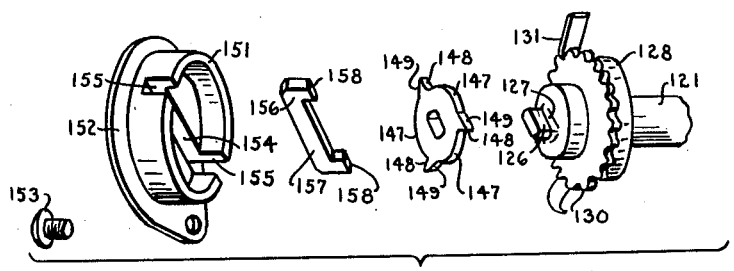
FIGURE 13 is an exploded view illustrating the structural relationship of the components of the reversible ratchet mechanism.
Figure 14:
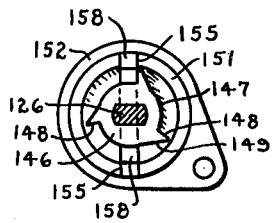
FIGURE 14 is a transverse section showing the components of FIGURE 13 assembled to permit use of the reel by a right handed person to rotate the pickup in one direction and prevent reverse rotation.

More particularly, the above mechanism, as shown in FIGURES 4, 13 and 14, includes a flat ratchet 146 provided with a squared opening which receives the squared end 126 of the solid shaft to key the ratchet thereto. The ratchet is of hardened steel and includes a plurality of arcuate surfaces 147 and a plurality of corresponding projections or teeth spaced 120° apart. Each tooth preferably includes a straight abutment surface 148 and an inclined surface 149 which joins and is substantially tangent to an arcuate surface 147. Three projections or teeth are preferably utilized. The side wall 14 of the reel frame, as shown in FIGURE 4, is provided with an opening 150 which more or less snugly receives a cup 151 preferably secured to a mounting plate 152 by rivets extending through the base of the cup and the mounting plate. The plate 152 preferably is detachably held in place by a screw 153 which is adapted for insertion through an aperture in an offset of the plate and connects with a threaded hole in the side wall 14.

The base of the cup is relatively thick and is provided with a transverse slot 154 and its side wall is provided with a pair of diametrically disposed longitudinal slots 155 which register with the slot 154 to provide a guideway. An elongated pawl or key 156 of hardened steel is disposed in the guideway for movement in a direction transverse to the longitudinal axis of the driven shaft. This pawl includes an elongated portion 157 and offset ends 158. The outer face of the ratchet 146 is adapted to bear against the inner surface of the elongated portion 157 and the arcuate surfaces 147 and inclined surfaces 149 of the ratchet are adapted to successively ride against the inner surfaces of the offset ends 158 to continuously reciprocate the pawl or key in the guideway when the solid shaft is rotated. When the key is disposed as in FIGURES 13 and 14 and the crank 124 is rotated clockwise by a right handed person, as indicated by the arrow in FIGURE 1, the pickup will also rotate in a clockwise direction and during these movements the key will reciprocate as aforesaid but rotation in a reverse or counter-clockwise direction is prevented by the straight surface 148 on a tooth engaging a side of one of the offset ends of the key. In other words, the alternate engagement of the inclined surfaces 149 of the ratchet with the offset ends of the key will produce a camming action to reciprocate the key to allow for free rotation of the pickup in one direction and when a force is applied to the pickup through an outward pull on the line to rotate the pickup in an opposite direction, a straight surface 148 of a tooth will engage the key or pawl and thereby prevent further rotation in the opposite or reverse direction. Whenever the outward pull of the line is sufficient to overcome the frictional resistance or drag between the drive gear and the tubular shaft through the friction members or elements, the pickup may be caused to rotate in such reverse direction to allow removal of the line from the spool.

To convert the reel for left hand use it is merely necessary to remove the mounting plate and cap as a unit from the reel frame, including the key and ratchet and then reverse the position of the ratchet as shown in FIGURE 15, after which the key, plate and cap are reassembled. With the ratchet thus reversed, the shaft 121 and pickup can be rotated in a counter-clockwise direction, as indicated by the arrow, and not in a clockwise direction when the reel is mounted on the underside of a pole 20 as shown in FIGURE 16.

The operating sequence of the reel will now be described. The reel, as shown in FIGURE 2, is in the line retrieving position. The line enters the reel housing through the eye 66, passes over an outer surface of the brake drum, turns inwardly at substantially a right angle over the rear peripheral edge 59 of the drum, past the pickup fingers 77, and is wound onto the spool in a clockwise direction by any one of the pickup fingers when the crank 124 is turned in a right hand direction. The crank is prevented from reverse or left hand rotation at all times by the anti-reverse mechanism comprising the key and ratchet. As set forth above, should it be desired to mount the reel under a pole or rod, in a true spinning fashion, the ratchet may be reversed on the squared end of the shaft, thereby allowing rotation in a left hand direction, but preventing normal right hand rotation.

The drive gear 133 mounted on the tubular shaft 120 is driven by contact through the friction members. The members 136 and 137 are keyed to the shaft and the members 135 are free to rotate on the shaft. Variable drag or driving friction is obtained by tightening or loosening the star wheel 123 threaded on the solid or drag shaft 121.

To cast the line having a bait at its free end, the actuator lever 10 is pushed downwardly to impart forward movement to the spool assembly, through the plunger or push rods 39, which are connected to the spool assembly, and fitting 29. Forward travel of the spool assembly causes the latter to engage and move the line pickup therewith, along the driven shaft 4, and during this movement, the line guard 3 contacts the peripheral edge of the brake drum to impart a braking action on the line. As the spool assembly is moved further in a forward direction, the line guard remains in stationary contact with the brake drum 6 and the braking pressure is maintained through the flexing of the spring fingers 43. The forward motion of the spool assembly may be continued until the surfaces 86 and/or the continuations 85 of the part 80 on the pickup clear, or are forward of the enlarged ends 89 of the legs of the U-shaped spring 87. The enlarged ends of the spring legs then move toward one another to effect a diameter or cross-dimension smaller than the outside diameter of the tubular part 80, thereby preventing the pickup from moving rearwardly with the spool, as manual pressure is released on the actuator or control lever 10.

Rearward travel of the spool, as well as the return of the lever 10 to normal position, is accomplished through the action of the helical springs 61 about the rods 39. As the spool moves rearwardly the rear edge of the spool flange 31 seats against the inner flange 56 of the line guard. The line guard is then moved away from the rear edge of the brake drum, releasing the braking action on the line. The opening or passage defined by the edge of the drum and the line guard can be readily controlled by the manual movement of the lever 10 to any desired amount ranging from a full braking pressure to an open, free passage for the line.

The line guard and brake drum are free to rotate. More particularly in this regard, when during a cast, the spool assembly is moved forwardly and the line opening defined by the guard ring and drum is reduced to the point that the line will contact the ring and drum, a rotational force will be imparted to them by the line as it unwinds from the spool. Further reduction of the line opening will increase the rotational force on the line guard ring and drum until they are in contact with sufficient pressure to prevent passage of the line therebetween and from the spool. This construction and action is unique and affords a "feathering" or graduated line controlling means, and thereby eliminates the sudden braking action usually inherent in spinning reels of this type.

To return the pickup to its operative line directing position, the crank is rotated which through the gear-train, comprised of gears 133 and 140, rotates the driven shaft 4 to which the pickup is keyed against rotation. The tubular part 80 connected to the pickup is urged against the enlarged ends of the U-shaped release spring 87 by the tapered helical return spring 91. As the part 80 is rotated by the driven shaft, the continuations 85 in this part spread or cam open the legs of spring 87 to the outside diameter of the bushing, thereby allowing the return spring 91 to push the part 80 into and under the arms of the release spring. The part 80 comes to rest against the washer 90, and the pickup is then in position to engage and direct the line onto the spool which serves as a support for the line. The drag mechanism and clicker mechanism function as previously set forth.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. A reel of a type which includes a frame, a spool mounted on the frame, a rotary driven shaft extending forwardly of the spool, a line pickup rotatable with the shaft for directing a line onto the spool, means including a drive shaft for rotating the driven shaft, and the improvement which comprises a reversible means engageable with the drive shaft in either of two positions for engaging means on the frame for selectively preventing rotation of the drive shaft in either of two directions.

2. A subassembly comprising a frame, a drive shaft rotatably mounted on said frame, abutment means on said frame substantially axially aligned with the shaft, and reversible means engageable with the drive shaft in either of two positions for engaging said abutment means for selectively preventing rotation of the drive shaft in either of two directions.

3. A spinning reel structure comprising a frame, a drive shaft, a cup carried by the frame and axially aligned with the drive shaft, said cup being provided with receiving means, a pawl disposed in said receiving means for movement in a direction transverse to the longitudinal axis of the drive shaft, and a ratchet carried by the drive shaft and cooperable with the pawl for imparting movement to the pawl during rotation of the drive shaft in one direction and serving to prevent rotation of the drive shaft in the opposite direction.

4. A mechanism for use in a fishing reel comprising a frame, a drive shaft mounted on the frame, a cup mounted on the frame and receiving an end of the drive shaft, a slot provided in the cup, a pawl mounted in the slot for movement in a direction transverse to the longitudinal axis of the shaft, and a ratchet carried by the shaft end, said ratchet and pawl being cooperable to permit rotation of the shaft in only one direction.

5. The structure defined in claim 4, in which the ratchet and cup are respectively detachably carried by the shaft and frame whereby the cup, pawl and ratchet may be disassembled and then reassembled to place the ratchet in a reversed position on the shaft so that the shaft can be rotated only in an opposite direction.

6. A mechanism for use with a reel provided with a rotatable shaft and a guideway disposed transverse to the longitudinal axis of the shaft, a pawl reciprocably mounted in the guideway, and a ratchet engageable with the shaft in either of two positions for rotation therewith to reciprocate the pawl and cooperate therewith for limiting rotation of the shaft in either one of two directions.

7. A mechanism for use in a fishing reel comprising a frame, a shaft rotatable in the frame, means carried by the frame and provided with a guideway disposed transverse to the longitudinal axis of the shaft, a pawl mounted for movement in said guideway, and a ratchet engageable with the shaft in either of two positions, said ratchet and said pawl being cooperable to selectively limit rotation of the shaft in either one of two directions.

8. A reel comprising a frame, a tubular bearing mounted on the frame, a tubular member journalled in the bearing, an abutment provided on the member, a gear rotatable on the member, friction elements abutting the sides of the gear, a shaft extending through the tubular member, a fitting fixed on an inner end of the shaft and means on its outer end for exerting pressure to cause the abutment and fitting to react against the elements and the latter agains said gear to afford a variable fricional driving connection between said gear and said member, said frame being provided with a guideway disposed transverse to the longitudinal axis of said shaft, a pawl movable in said guideway, and a ratchet carried by said shaft adjacent said fitting and cooperating with said pawl for limiting rotation of the shaft in one direction.

9. The structure defined in claim 8, in which the fitting is provided with abutments and the gear with a yieldable element engageable with said abutments to indicate when the gear rotates relative to said tubular member.

References Cited in the file of this patent

UNITED STATES PATENTS

| | | |
|---|---|---|
| 565,402 | Borgardus | Aug. 4, 1896 |
| 2,134,405 | Hulshizer | Oct. 25, 1938 |
| 2,312,156 | Fuehrer | Feb. 23, 1943 |
| 2,498,626 | Bivans | Feb. 21, 1950 |
| 2,546,465 | Martini | Mar. 27, 1951 |
| 2,613,468 | Hand | Oct. 14, 1952 |
| 2,641,419 | Cowen et al. | June 9, 1953 |
| 2,643,073 | Bourne et al. | June 23, 1953 |
| 2,675,192 | Hull | Apr. 13, 1954 |
| 2,686,016 | Kilian | Aug. 10, 1954 |
| 2,705,113 | Bonanno | Mar. 29, 1955 |
| 2,775,417 | Freund | Dec. 25, 1956 |
| 2,777,645 | Wood | Jan. 15, 1957 |
| 2,862,679 | Denison et al. | Dec. 2, 1958 |